Sept. 20, 1971  R. O. GORDON  3,605,814
PRESSURE REGULATING VALVE
Filed Nov. 6, 1969  2 Sheets-Sheet 1
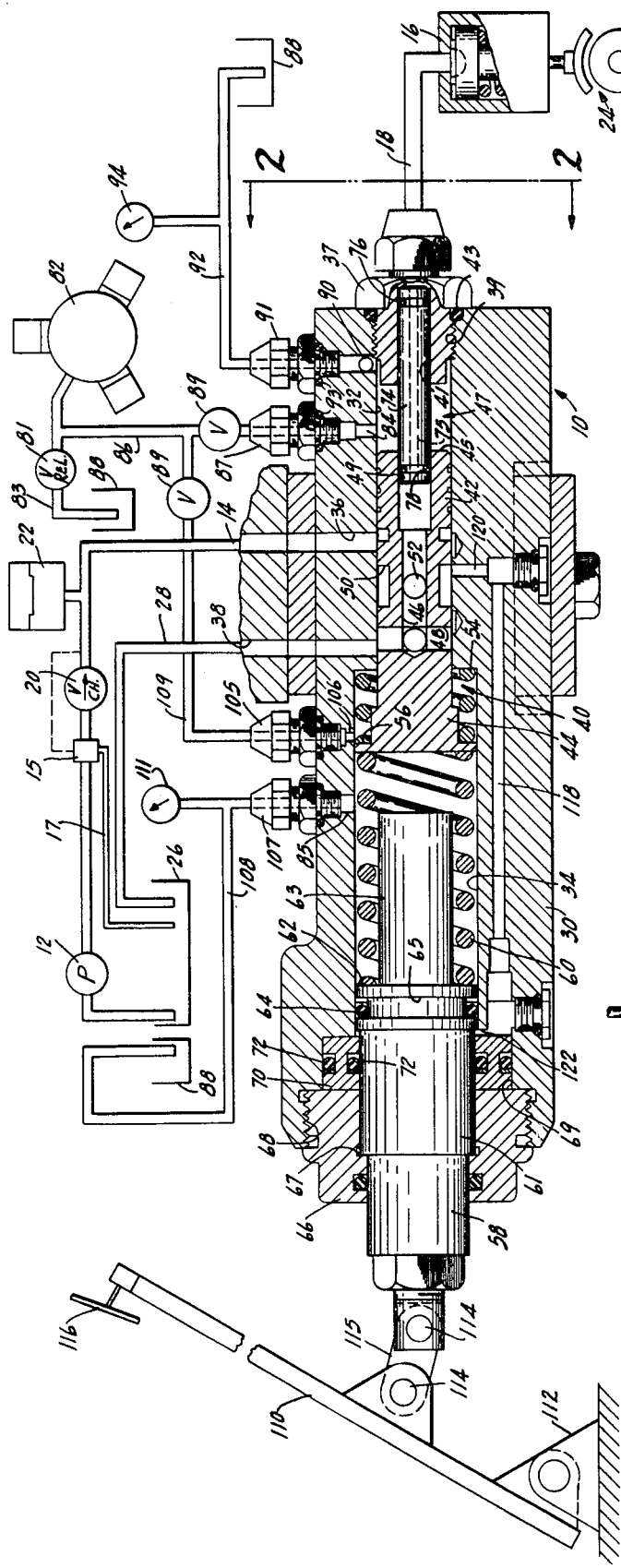
INVENTOR:
RICHARD O. GORDON
BY:
James E. Nilles
ATTORNEY Sept. 20, 1971  R. O. GORDON  3,605,814
PRESSURE REGULATING VALVE
Filed Nov. 6, 1969  2 Sheets-Sheet 2
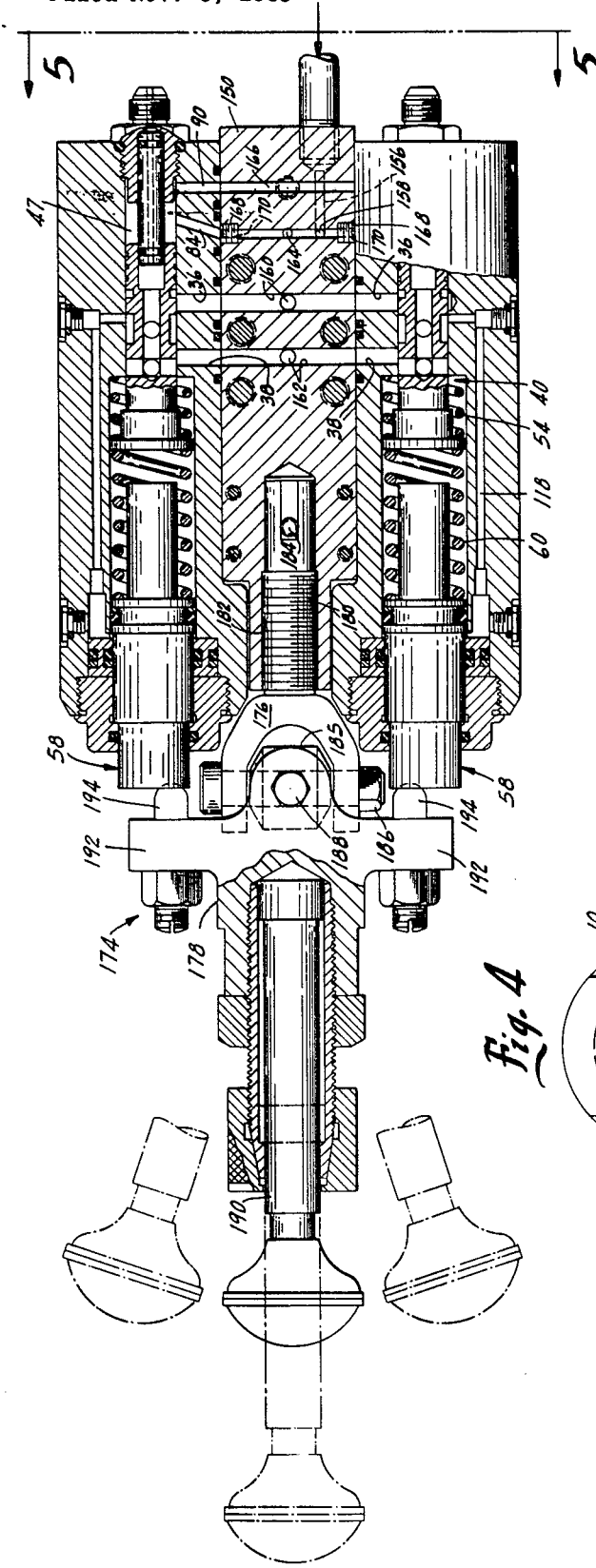
INVENTOR:
RICHARD O. GORDON
BY: James E. Nilles
ATTORNEY

United States Patent Office 3,605,814
Patented Sept. 20, 1971

3,605,814
PRESSURE REGULATING VALVE
Richard O. Gordon, Belgium, Wis., assignor to
Harnischfeger Corporation, Milwaukee, Wis.
Filed Nov. 6, 1969, Ser. No. 874,443
Int. Cl. F16k *11/07, 29/00;* B60t *13/16*
U.S. Cl. 137—636
15 Claims

ABSTRACT OF THE DISCLOSURE

Disclosed herein is a pressure regulating valve including a spool valve mounted for modulating movement in a valve passage to control the admission of high pressure hydraulic fluid into the valve passage and having a fluid flow passage, a piston positioned in the valve passage and operatively associated with said fluid flow passage to define a hysteresis chamber in the valve passage and a reaction chamber in the fluid flow passage in the spool valve, a fluid piston pump connected to the valve to provide a pulsating force at each end of the spool valve and a control valve connected to control the pressure of the pulsating fluid at each end of the spool valve. A hydraulic power assist is provided for actuating the spool valve when operating under heavy loads.

BACKGROUND OF THE INVENTION

Pressure regulating valves of the type contemplated herein are used to control hydraulic fluid force for various hydraulically operated devices such as brake cylinders for the brakes on the hoisting drums and digging drums on any of a number of different types of truck cranes. The fixed volume type brake actuators formerly used to control the hydraulic force have generally been replaced by variable full flow type valves in order to compensate for volume loss due to leakage in the brake system. This type of a valve uses a modulating spool valve having a reaction area to control the pressure of the fluid acting on the hydraulically operated devices by controlling the admission of high pressure fluid to the hydraulic line from a main high pressure pump. The force of the high pressure fluid acting on the reaction area furnishes "feel" for the operator. However, due to the inherent drag or hysteresis in the movement of the spool valve, a lag is introduced in the operation of the valve causing hunting and introducing a vibration or shaking in the movement of the member being controlled.

This type of a valve is also difficult to operate at low pressures wherein the pressure on the reaction area has little force and the operator is not able to "feel" the movement of the spool valve and consequently the pressure being applied to the hydraulic device. If too much pressure is applied to the hydraulic device, the device may become locked causing a sudden stop to the movement of the device being controlled. At high operating pressures of the device, the force on the reaction area of the spool valve can equal or exceed the force available from the operator making it difficult to provide sufficient force to control the operation of the device being controlled.

SUMMARY OF THE INVENTION

The pressure regulating valve disclosed herein minimizes drag or hysteresis by imparting a pulsating force to the spool valve to assure full fluid flow at all times. This is accomplished by positioning a piston in the valve to form a hysteresis chamber in the valve passage and a reaction chamber in the flow passage through the spool valve. A pulsating hydraulic fluid is admitted to the hysteresis chamber to apply a pulsating force to the reaction surface of the spool valve. The pulsating force can also be applied to the other end of the spool valve to impart a pulsating force to both sides of the valve simultaneously. Continual pulsing of the spool valve minimizes hysteresis and thereby reduces hunting to a minimum.

The pressure of the pulsating fluid can be adjusted to provide "feel" for the operator particularly at the low operating pressures. At the high operating pressures of the brake cylinder, the pressure of the pulsating fluid can be increased on one side of the brake valve and decreased on the other side to aid the operator in the operation of the brake valve. A power assist passage is also provided in the brake valve to aid the operator in actuating the spool valve at the high operating pressures. The power assist passage can be connected to provide power assist at any point in the movement of the spool valve.

Other objects and advantages of the invention will become apparent from the following description when read in connection with the accompanying drawings.

BRIEF DESCRIPTION OF THE DRAWINGS

FIG. 1 is a sectional side view showing the pressure regulating valve of this invention used as a brake valve with the spool valve in the fluid return position;

FIG. 2 is an end view of the valve partly broken away to show the valve for controlling hysteresis pressure;

FIG. 3 is a sectional view of a portion of FIG. 1 showing the spool valve in the intermediate position in the valve;

FIG. 4 is a sectional view of a joy stick control assembly using the valve of this invention;

FIG. 5 is an end view of the joy stick control assembly.

FIG. 6 is a schematic view of the cross bores in the fluid control block for the joy stick assembly.

DESCRIPTION OF THE INVENTION

The pressure regulating valve 10 of this invention as shown in FIG. 1 is connected to a pressure pump 12 through a line 14 and to a brake cylinder 16 through a line 18. A check valve 20 and an accumulator 22 are generally provided in the line 14 to assure an operating hydraulic pressure of 1400–1500 p.s.i. in line 14. A pilot operated unloading valve 15 is provided in line 14 and is responsive to the pressure of the fluid in the line 14 downstream from the check valve 20 to dump fluid directly to a reservoir 26 through line 17. The brake cylinder 16 is connected to actuate a friction brake 24 which can be used to control any of the various moving parts of a crane or the like. Fluid from the valve 10 is returned to the reservoir 26 through a line 28 for recirculation by the pump 12.

A brake cylinder 16 and friction brake 24 are shown by way of example only since the valve 10 can be used to control any hydraulic pressure controlled device or as a main control valve to control such devices directly.

The pressure regulating valve 10 includes a housing 30 having a first bore or valve passage 32 and a second bore or spring passage 34 of larger diameter than the valve passage 32. The valve passage 32 is connected to the brake cylinder line 18 by means of a threaded fitting 37 which is screwed into a threaded section 39 provided at the end of passage 32 and has an outlet port or bore 41. The fitting 37 is sealed to the housing 30 by an O-ring 43. Fluid is returned to the return line 28 by means of a return port 38 in the housing 30. A threaded section 68 of large diameter is provided at the open end of passage 34 and is connected to the passage 34 by an intermediate section 69.

The flow of high pressure hydraulic fluid from the pressure pump 12 and accumulator 22 to the housing 30 is controlled by means of a spool valve 40 having a first portion or plunger 42 mounted for axial motion in the valve passage 32 and an enlarged head or cap 44 mounted for axial motion in the spring passage 34. The plunger 42 is provided with a reaction area 45 and a flow passage 46 having an enlarged bore 49 at the open end of the plunger 42 and intersected at the inner end by cross bores 48. An annular groove 50 is provided around the outer surface of the plunger 42 in a spaced relation to the cross bores 48 and is connected to the flow passage 46 by ports 52. The annular groove 50 provides a connection between inlet port 36 and the valve passage 32 through ports 52 and flow passage 46 when the valve 40 is moved to the right. The valve passage 32 is connected to the return port 38 through the flow passage 46 and the cross bores 48 in the plunger 42, when the valve is moved to the left (FIG. 1). The spool valve 40 is biased to the left or to a fluid return position by means of a small compression spring 54 positioned between the end of spring passage 34 and a flange 56 on the cap 44.

The spool valve 40 is actuated to pressurize the fluid in valve passage 32 by means of a valve stem 58 and a compression spring 60 provided in the spring passage 34. The valve stem 58 includes a piston head 62, an enlarged center section 61 and a small cylindrical extension 63. The piston head 62 is sealed in the passage 34 by means of an O-ring 64 positioned in an annular groove 65 in the piston head 62. The valve stem 58 is retained in the return passage 34 by means of a gland nut 66 having an internal shoulder 67 which is positioned to engage the enlarged section 61 of the valve stem. The gland nut is screwed into the threaded section 68 in the open end of the passage 34 until it engages a seal retainer 70 provided in the intermediate section 69. O-ring seals 72 are provided on the inner and outer surfaces of the seal retainer to seal the valve stem 58 in passage 34. The compression spring 60 is positioned between the piston head 62 and the flange 56 on the spool valve 40 and has a greater spring rate than the spring 54.

The valve is pressurized by moving the valve stem 58 into the passage 34, to the right in FIG. 1, to push the spring 60 against the spool valve 40 compressing spring 54 and moving the plunger 42 on the spool valve 40 through an intermediate position in the passage 32 with both ports 36 and 38 closed. The initial motion of the spool valve 40 will close the cross bores 48 (FIG. 3) and on further movement of the spool valve to the right, the port 36 will open allowing high pressure fluid to enter passage 32 through groove 50, port 52 and passage 46 and actuate the brake cylinder 16. When the combined force of the hydraulic fluid in passage 32 acting on reaction area 45 and the return force of the compressed spring 54 exceeds the spring force of spring 60, the spool valve 40 will move to the left compressing the spring 60 until port 36 is closed. Once the desired pressure is applied to the brake cylinder, the motion of the valve stem 58 is stopped and the valve stem 58 is held in a fixed position. If the hydraulic pressure in the line 18 drops, the compressed spring 60 will move the spool valve 40 against the bias force of the spring 54 until groove 50 is moved into alignment with port 36 allowing high pressure fluid from line 14 to enter passage 32 through groove 50, port 52 and flow passage 46. As the fluid pressure again builds up in passage 32 and acts against the reaction area 45 of the plunger 42, the spool valve 40 will be moved to the left against the bias of spring 60 until the port 36 is closed. If the combined force of the hydraulic fluid in passage 32 and the spring 54 exceed the force of spring 60, the spool valve will move to the left opening port 38.

If the brake cylinder is held for a long period of time, a hunting effect results due to the change of pressure in the line 18 causing the spool valve 40 to modulate in the passage 32. The modulating or hunting action of the spool valve 40 is amplified if there is any appreciable delay in the response of the spool valve to either the loss of pressure in the line 18 or the build up of excessive pressure in the passage 32 before the port 36 is closed.

In accordance with the invention, means are provided for imparting a pulsating hydraulic fluid force to the spool valve 40 to minimize the modulating or hunting action of the spool valve 40 by shaking out the hysteresis. Such means is in the form of a hysteresis chamber 47 provided in passage 32 which is connected to a fluid piston pump 82. More particularly, the chamber 47 is formed in the passage 32 by means of a piston 74 having an axial passage 75. The piston 74 is mounted in the axial bore 41 in the fitting 37 and extends into the enlarged section 49 in flow passage 46 in the spool valve 40. The piston 74 is sealed in the bore 41 by an O-ring 76 and in the section 49 of passage 46 by an O-ring 78. The passage 46 in the spool valve 44 is connected to the line 18 by means of the axial passage 75 in the piston 74 to allow fluid to flow to the line 18. The piston 74 and flow passage 46 form a reaction chamber for pressurizing fluid in the passage 46 when the spool valve 40 is moved to the right closing cross bores 48. The reaction area of the reaction chamber in passage 46 is equal to the cross sectional area of the piston 74 as more fully described below.

The hydraulic pump 82 is connected to the chamber 47 through a fixed orifice or port 84 in the housing 30 and a line 86 connected to the port by a fitting 87. Fluid pumped into the chamber 47 is discharged to a fluid reservoir 88 through a port 90 having a larger diameter than port 84, a fitting 91 and a line 92. The fittings 87 and 91 are sealed by O-rings 93. The pump 82 shown is a three cylinder pump which normally operates at 2,000 r.p.m.'s producing 6,000 pulses per minute in the fluid which is pumped into the hysteresis chamber 47. Although a three cylinder pump is described, any hydraulic pumping device can be used to provide the pulsating fluid. The maximum pressure of the fluid from the pump to the valve can be preset by providing a pressure relief valve 81 in a line 83 connected to line 86 which discharges into reservoir 88.

Means are provided to control the pressure of the fluid in the hysteresis chamber 47 in order to provide an operating pressure or "feel" for the operator in the operation of the brake valve at low operating pressures of the brake cylinder. Such means as shown in FIG. 2, is in the form of a needle valve 96 provided in a bore 98 in the housing 30. The needle valve includes a needle 100 which extends into the return port 90, a threaded section 101 and a head 102. The needle valve 96 is threadedly received in a threaded aperture 103 provided at the end of bore 98 and is sealed within the bore 98 by an O-ring 104 provided in a groove 106 in the head 102. The needle 100 extends across the port 90 and is seated in a recess provided on the opposite side of port 90. The diameter of the needle 100 should be sufficiently large to completely block the port 90. As the pressure in the hysteresis chamber 47 is increased, a greater amount of pressure will be required to actuate the spool valve 40, thus providing a "feel" for the operator in controlling the brake cylinder 16. This is particularly significant at low operating pressures, where little force is provided by the pressure of the fluid in the reaction chamber or passage 46.

For example, in a foot pedal actuated valve, a lever arm 110 is pivotally connected to a fixed bracket 112 and to the end of the valve stem by pivot pins 114 and a link 115. A foot pedal 116 is provided at the end of the lever arm 110 and provides a 16/1 operating ratio between the movement of the lever arm 110 and the movement of the valve stem 58. It should be apparent that a small movement of the valve stem 58 will produce a high pressure charge to the brake cylinder 16 locking the friction brake 24 shut. Therefore, any movement of the lever arm could produce a high pressure build up in the valve. If the friction brake 24 is being used to control the lowering motion of a boom or winch, any sudden stop of the brake will cause a violent vibration in the boom. By providing the proper back pressure in the hysteresis chamber 47, the operator can "feel" the movement of the valve stem 40 and will avoid the application of an excessive force on the brake cylinder 16.

The pulsating force of the hydraulic fluid from pump 82 can also be applied to the other end or cap 44 of the valve stem 40 by connecting the pump 82 to the spring passage 34 through a line 109, a fitting 105 and a fixed diameter port 106 in the housing 30. Shut off valves 89 are provided in lines 86 and 109 to control the flow of fluid from the pump 82. The fluid is returned to the reservoir 88 through a return port 85 provided in the housing 30, a fitting 107 and a return line 108. The pressure of the fluid in spring passage 34 is controlled by a control valve connected to valve 96 provided in port 85. The pressure of the pulsating fluid in the spring passage 34 will also provide "feel" for the operator due to the force produced by the fluid acting on the end of the valve stem 58.

Means are provided to power assist the movement of the valve stem 58 at high operating pressures of the brake cylinder. Such means is in the form of a pressure assist channel 118 which is provided in the housing 30 and is connected to the passage 32 by a port 120 and to the passage 34 by a port 122. The port 120 is aligned with the annular groove 50 in the spool valve and the port 122 enters the passage 34 between the retainer ring 70 and the piston head 62. Whenever the spool valve is moved far enough to the right to close the cross bores 48 and open port 36 allowing high pressure fluid to enter groove 50, the buildup of hydraulic pressure in groove 50 will be applied to the piston head 62 through port 120, channel 118 and port 122 furnishing a power assist force to the manual force being applied to the stem 54. Power assist is normally required only at the high operating pressures.

If desired the valve 10 can be controlled hydraulically from a remote point by merely controlling the pressure of the fluid in the spring passage 34. This is accomplished by closing valve 96 and controlling the flow of fluid through port 85 by means of a remote control valve. As the pressure of the fluid builds up in passage 34, the force of the fluid will act on the surface of cap 44, moving the spool valve 40 to the right. A pressure gauge 111 can be provided in line 108 to indicate the pressure of the fluid in the spring passage 34.

In a preferred embodiment of this valve, the reaction area 45 of the spool valve was .306 square inch and the reaction area of the piston 75 was .0928 square inch, leaving a reaction area of .2032 square inch in the hysteresis chamber. The maximum pressure of the high pressure fluid was maintained at approximately 1500 pounds per square inch and the maximum hysteresis fluid pressure was set at 500 pounds per square inch. At low operating pressures of 200 p.s.i. in line 18, a force of only 20 pounds is required to operate the valve stem. Using a lever arm having a 16/1 ratio would require only one pound of force on the brake pedal to actuate the valve. To provide sufficient "feel" for the operator, the pressure in the hysteresis chamber was set at 500 p.s.i. providing an added force of 100 pounds on the valve stem and approximately 6 pounds of force at the foot pedal.

When operating at maximum pressure conditions of 1500 p.s.i. in the line 18 and 500 p.s.i. in the hysteresis chamber, a force of approximately 250 pounds is applied to the valve stem—150 pounds in the reaction chamber 49 and 100 pounds in the hysteresis chamber 47. The power assist provided by the piston 62 is used to reduce at least a portion of this force. The power assist piston area is .117 to .124 square inch. This area is made slightly greater than the area of piston 75 in order to also balance out the force of spring 54. Therefore, at maximum operating conditions, the only force required to operate the valve will be the force necessary to overcome the pressure of the fluid in the hysteresis chamber 47 or 6 pounds.

In the embodiment shown in FIGS. 4, 5 and 6, the valve of this invention has been incorporated into a joy stick type control assembly wherein four of the valves 10 are mounted on a common fluid control block 150. Each of the valves 10 is identical to the valve shown in FIG. 1 and identical parts are identified by the same numbers. Means are provided in the control block 150 for interconnecting the inlet ports 36, the return ports 38, and the hysteresis chambers 47 in the valves 10. Such means is in the form of a number of intersecting cross bores 160, 162, 164 and 166 provided in the fluid block 150. More particularly, the cross bores 160 are aligned with the ports 36 to the flow passages 46, the cross bores 162 are aligned with the return ports 38 to the return passages and the cross bores 164 and 166 are aligned with the ports 84 and 90, respectively, to the hysteresis chambers 47. High pressure fluid is admitted to the cross bore 160 by means of first inlet passage 152 and a connection passage 154 (FIGS. 5 and 6). Pulsating fluid is admitted to the cross bores 164 by means of a second passage 156 and a connecting passage 158. Fluid is returned to the reservoir from passages 162 and 166 through an outlet passage 159 and connecting passages 161 and 163, respectively.

Each of the hysteresis chambers 47 has individual pressure control by means of the control valves 96 as described above. Means are provided to retard the flow of fluid into the hysteresis chambers 47 in the form of a plug 168 having a small orifice 170 screwed into the end of each of the passages 164. The pulsating pump which is used to provide the pulsating fluid to the hysteresis chambers 47 must be of sufficient size to provide enough volume of fluid to maintain the pressure in all of the chambers 47. If the control valve 96 for any one of the hysteresis chambers 47 is opened fully, the loss in volume and corresponding drop in pressure in that chamber will not effect the volume or pressure in any other chamber due to the small orifice 170 provided in the bore 164. Each hysteresis chamber 47 can therefore be adjusted to any pressure without effecting any of the other chambers.

The valves 10 are actuated by means of a joy stick assembly 174 secured to the control block 150. This assembly 174 includes a lower yoke 176 and an upper yoke 178. The lower yoke 176 has a threaded shank 180 threadedly received in a threaded aperture 182 provided in the control block 150 and retained therein by a set screw 184. The upper yoke 178 is pivotally connected to the lower yoke 176 by a swivel pin 185 mounted on a bolt 186 in the lower yoke 176 and is pivotally connected to the swivel pin 185 by cap screws 188.

Means are provided for presetting the initial operating pressure of the valves in the form of a radially extending flange 192 on the upper yoke and a number of adjustable screws 194 positioned to engage each of the valve stems 58 in the brake valves. A joy stick or lever 190 of variable length is secured to the upper yoke 178 and is moved fore and aft and/or side to side to move the screws 194 against the valve stem 58 to actuate the valves. The adjustable screws 194 can be pre-set to establish predetermined starting pressures in each of the valves 10 in the assembly. By the proper setting of the starting pressures of the valves, there will be no delay or "dead band" in the initiation of the movement of the device being controlled.

RÉSUMÉ

By means of the present invention, a full flow pressure regulating valve is provided which can be used to control pressure to various hydraulic actuators or to provide the main fluid for a hydraulically actuated device. Pulsating hydraulic fluid from a remote source is applied to either or both ends of the spool valve to shake out any hysteresis in the response of the spool valve and thereby eliminate excessive variations in the fluid pressure being applied to the device being controlled. Hydraulic fluid from a remote source can also be used to hydraulically operate the valve.

The ability of the operator to "feel" the movement of the valve can also be adjusted by adding the force applied by the pressure of the pulsating fluid in the hysteresis chamber to the spool valve to the force applied by the pressure of the fluid in the reaction chamber to the spool valve. A power assist to aid in the movement of the valve stem when operating at high pressure is also included in this valve. The valve can be incorporated into a joy stick assembly and pre-set to eliminate the "dead band" normally present in a hydraulic valve before pressure buildup is sufficient to actuate the device being controlled.

What is claimed is:

1. A pressure regulating valve including
   a housing having a passage,
   a spool valve mounted for modulating movement in said passage to regulate the hydraulic fluid pressure to a hydraulically actuated device, said spool valve having a bore, and
   pump means operatively connected to said passage for imparting a pulsating hydraulic force to said spool valve, said pump means including a piston mounted in said passage and extending into said bore in said spool valve to define a hysteresis chamber in said passage and
   a reaction chamber in said spool valve.

2. A valve according to claim 1 wherein said means includes a fluid piston pump connected to said passage.

3. A valve according to claim 1 wherein said hysteresis chamber includes an inlet port and an outlet port, and said pump means includes
   a fluid piston pump connected to said inlet port, and a control valve connected to said outlet port to control the pressure of the pulsating fluid in said hysteresis chamber.

4. A valve according to claim 1 wherein said pump means is connected to said passage and to said hysteresis chamber to apply a pulsating force to both sides of said spool valve.

5. A valve according to claim 4 including means for controlling the pressure of said pulsating fluid on both sides of said spool valve.

6. A pressure regulating valve according to claim 1 including means connected to said passage for remotely controlling the force acting on said spool valve.

7. A pressure regulating valve comprising
   a housing having a passage including an inlet port and an outlet port connected to a hydraulically actuated device,
   means connected to said inlet port for supplying a high pressure hydraulic fluid thereto,
   means in said passage responsive to the pressure of fluid in said outlet port for regulating the admission of fluid through said inlet port into said passage, said regulating means including a spool valve having an axial passage, and
   means connected to said passage for imparting a pulsating hydraulic force to said regulating means,
   said imparting means including a piston positioned in said passage and extending into said axial passage in said spool valve to define a hysteresis chamber in said passage and a reaction chamber in said axial passage in said spool valve and a fluid piston pump connected to said hysteresis chamber.

8. A valve according to claim 7 wherein said imparting means includes a fluid piston pump connected to said passage.

9. A valve according to claim 7 including means connected to said passage for regulating the pressure in said hysteresis chamber.

10. A valve according to claim 7 wherein said regulating means includes a spool valve,
    a valve stem and
    a compression spring operatively connecting said valve stem to said spool valve.

11. A joy stick hydraulic control assembly comprising
    a fluid control block having a number of fluid flow passages,
    a number of pressure regulating valves mounted on said block, each of said valves including a housing have a fluid control passage and a spool valve having an axial passage mounted for modulating movement in said fluid control passage, said flow passages in said fluid control block being connected to said fluid control passages in said valves,
    means pivotally mounted on said block for selectively controlling said spool valves, and
    means connected to said control block for imparting a pulsating hydraulic force to each of said spool valves, said imparting means includes a piston positioned in said fluid control passage and extending into said axial passage.

12. A joy stick assembly according to claim 11 wherein said imparting means includes a piston pump connected to said passage.

13. A joy stick assembly according to claim 11 including means connected to said control means for presetting the initial operating pressure of each of the valves.

14. A pressure regulating valve including
    a housing having a passage,
    a spool valve mounted for modulating movement in said passage to regulate the hydraulic fluid pressure to a hydraulically actuated device,
    means including a valve stem operatively connected to said spool valve for controlling the force applied to said spool valve, and
    means connecting said passage to said valve stem for applying the pressure of the hydraulic fluid to said valve stem to provide a power assist to the movement of said valve stem.

15. A pressure regulating valve according to claim 14 including means connected to said passage for imparting a pulsating hydraulic force to said spool valve.

References Cited

UNITED STATES PATENTS

| | | | |
|---|---|---|---|
| 1,512,805 | 10/1924 | Roucka | 137—330X |
| 2,368,628 | 2/1945 | Bates | 137—330X |
| 2,450,944 | 10/1948 | Eastman | 137—330 |
| 2,455,315 | 11/1948 | Rose et al. | 137—330X |
| 2,794,609 | 6/1957 | Perry | 137—636X |
| 3,215,155 | 11/1965 | Oishi | 137—330X |

HENRY T. KLINKSIEK, Primary Examiner

U.S. Cl. X.R.

303—10; 137—330, 636.2